(12) United States Patent
Broder

(10) Patent No.: US 6,560,600 B1
(45) Date of Patent: May 6, 2003

(54) METHOD AND APPARATUS FOR RANKING WEB PAGE SEARCH RESULTS

(75) Inventor: Andrei Z. Broder, Menlo Park, CA (US)

(73) Assignee: Alta Vista Company, Palo Alto, CA (US)

( * ) Notice: Subject to any disclaimer, the term of this patent is extended or adjusted under 35 U.S.C. 154(b) by 282 days.

(21) Appl. No.: 09/696,922

(22) Filed: Oct. 25, 2000

(51) Int. Cl.$^7$ ............................................... G06F 17/30
(52) U.S. Cl. ........................ 707/7; 707/3; 707/4; 707/5; 707/101; 707/501
(58) Field of Search .............................. 707/2, 3, 5, 10, 707/513, 514, 100, 102, 4, 101, 103, 104, 501

(56) References Cited

U.S. PATENT DOCUMENTS

| | | | | |
|---|---|---|---|---|
| 5,895,470 A | * | 4/1999 | Pirolli et al. | 707/101 |
| 6,073,135 A | * | 6/2000 | Broder et al. | 707/10 |
| 6,112,203 A | * | 8/2000 | Bharat et al. | 707/102 |
| 6,138,113 A | * | 10/2000 | Dean et al. | 707/100 |
| 6,285,999 B1 | * | 9/2001 | Page | 707/5 |
| 6,321,220 B1 | * | 11/2001 | Dean et al. | 707/2 |

OTHER PUBLICATIONS

Chakrabarti et al., "automatic resource compilation by analyzing hyperlink structure and associated text", http://decweb.ethz.ch/www7/1898/com1898.htm, pp. 1–13.*

Bharat et al., "the connectivity sever: the fast access to linkage information on the web", http://www7.scu.edu.au/programme/fullpapers/1938/com1938.htm, pp1–13.*

Brin et al., "The anatomy of a large scale hypertextual web search engine", http://google.stanford.edu, pp. 1–18.*

Jon M. Kleinberg, "Authoritative sources in a hyperlinked environment", ACM, May 1997, pp. 1–31.*

* cited by examiner

*Primary Examiner*—Jean M. Corrielus
(74) *Attorney, Agent, or Firm*—Pennie & Edmonds LLP

(57) ABSTRACT

A method and apparatus for ranking a plurality of pages identified during a search of a linked database includes forming a linear combination of two or more matrices, and using the coefficients of the eigenvector of the resulting matrix to rank the quality of the pages. The matrices includes information about the pages and are generally normalized, stochastic matrices. The linear combination can include attractor matrices that indicate desirable or "high quality" sites, and/or non-attractor matrices that indicate sites that are undesirable. Attractor matrices and non-attractor matrices can be used alone or in combination with each other in the linear combination. Additional bias toward high quality sites, or away from undesirable sites, can be further introduced with probability weighting matrices for attractor and non-attractor matrices. Other known matrices, such as a co-citation matrix or a bibliographic coupling matrix, can also be used in the present invention.

39 Claims, 4 Drawing Sheets

METHOD AND APPARATUS FOR RANKING WEB PAGE SEARCH RESULTS

BACKGROUND OF THE INVENTION

1. Field of the Invention

This invention relates generally to computerized information retrieval, and more particularly to identifying related pages in a hyperlinked database environment such as the World Wide Web.

2. Description of the Related Art

It has become common for users of host computers connected to the World Wide Web (the "Web") to employ Web browsers and search engines to locate Web pages having specific content of interest to users. A search engine, such as Digital Equipment Corporation's AltaVista search engine, indexes hundreds of millions of Web pages maintained by computers all over the world. The users of the hosts compose queries, and the search engine identifies pages that match the queries, e.g., pages that include key words of the queries. These pages are known as a "result set." In many cases, particularly when a query is short or not well defined, the result set can be quite large, for example, thousands of pages. The pages in the result set may or may not satisfy the user's actual information needs. The vast majority of users are not interested in retrieving the entire huge set of resources. Most users will be quite satisfied with a few authoritative results which are highly relevant to the topic of the query. The challenge is to retrieve only the most relevant resources to the query.

The Web is a hyperlinked collection. In addition to the textual content of the individual pages, the link structure of such collections contains information which can, and should, be tapped when searching for authoritative sources. Consider the significance of a link p. With such a link p suggests, or even recommends, that surfers visiting p follow the link and visit q. This may reflect the fact that pages p and q share a common topic of interest, and that the author of p thinks highly of q's content. Such a link, called an informative link, is p's way to confer authority on q. Note that informative links provide a positive critical assessment of q's contents which originates from outside the control of the author of q (as opposed to assessments based on q's textual content, which is under complete control of q's author).

The vicinity of a Web page is defined by the hyperlinks that connect the page to others. A Web page can point to other pages, and the page can be pointed to by other pages. Close pages are directly linked, farther pages is are indirectly linked via intermediate pages. This connectivity can be expressed as a graph where nodes represent the pages, and the directed edges represent the links. The vicinity of all the pages in the result set, up to a certain distance, is called the neighborhood graph.

Specifically, the Kleinberg algorithm attempts to identify "hub" pages and "authority" pages in the neighborhood graph for a user query. Hubs and authorities exhibit a mutually reinforcing relationship. The Kleinberg algorithm determines related pages starting with a single page. The algorithm works by first finding a set of pages that point to the page, and then running the base algorithm on the resulting graph. However, this algorithm for finding related pages does not deal with popular URLs, with neighborhood graphs containing duplicate pages, or with cases where the computation is totally dominated by a single "hub" page. The algorithm also does not include an analysis of the contents of pages when it is computing the most related pages.

The Google search engine uses a feature called PageRank to prioritize the results of web keyword searches. The PageRank technique examines a single random walk on the entire Web. PageRank assumes page A has pages T1 . . . Tn which point to it (i.e., are citations). The parameter d is a damping factor which can be set between 0 and 1. Also C(A) is defined as the number of links going out of page A. The PageRank (PR) of a page A is given as follows:

$$PR(A)=(1-d)+d(PR(T1)/C(T1)+ \ldots +PR(Tn)/C(Tn))$$

The PageRanks form a probability distribution over the web pages, so the sum of all web pages' PageRanks is one. PageRank or PR(A) corresponds to the principal eigenvector of the normalized link matrix of the web. The ranking of web sites is independent of the search query, and no distinction is made between hubs and authorities, as with the Kleinberg algorithm. There is also no provision for externally evaluating sites and using the evaluations to weigh the usefulness rankings.

Another method for ranking pages in a search result known in the art is disclosed in a paper entitled "The Stochastic Approach for Link-Structure Analysis (SALSA) and the TKC Effect", by Ronnie Lempel and Shlomo Moran, which is published on the Web at the website for the Ninth International World Wide Web Conference, held in Amsterdam, The Netherlands, from May 15–19, 2000. The SALSA method examines random walks on graphs derived from the link structure among pages in a search result. While preserving the theme that Web sites pertaining to a given topic should be split into hubs and authorities, it replaces Kleinberg's Mutual Reinforcement method by a stochastic method, in which the coupling between hubs and authorities is less tight. The method is based on considering a bipartite graph G, whose two parts correspond to hubs and authorities, where an edge between hub r and authority s means that there is an informative link from r to s. Then, authorities and hubs pertaining to the dominant topic of the sites in G should be highly visible (reachable) from many sites in G. These sites are identified by examining certain random walks in G, under the proviso that such random walks will tend to visit these highly visible sites more frequently than other, less connected sites. The SALSA approach is based upon the theory of Markov chains, and relies on the stochastic properties of random walks performed on a collection of sites. It differs from Kleinberg's Mutual Reinforcement approach in the manner in which the association matrices are defined. The SALSA approach also initially assumes uniform probability over all pages, and relies on the random walk process to determine the likelihood that a particular page will be visited.

It is therefore desireable to provide a method for ranking the relative quality, or relevance, of pages with respect to one another, that factors in the probability of a page being viewed without requiring a random walk.

SUMMARY OF THE INVENTION

The invention provides a method whereby a linear combination of matrices that provide information about the pages can be used to rank the pages. This allows results to be ranked based on two or more "page qualities" that are sought by the user, thus providing highly relevant results to the user.

In one embodiment, a method of ranking a plurality of pages identified during a search of a linked database is provided that includes:

forming a linear combination of two or more matrices, wherein each matrix includes information about at least a portion of the plurality of pages;

determining an eigenvector of the linear combination; and ranking the plurality of pages based on the eigenvector.

The coefficients of the eigenvector provide a measure of the quality of each page in relation to the other pages. The eigenvector used to rank the results can be the principal eigenvector or a secondary eigenvector. The matrices are generally normalized, stochastic matrices.

The invention accommodates external, subjective or objective judgment regarding the quality of a page in relation to it content or the number of linkages included in the page that are likely to be useful. The judgments are represented in attractor matrices to indicate desirable or "high quality" sites, while non-attractor matrices indicate sites that are undesirable. Attractor matrices and non-attractor matrices can be used alone or in combination with each other in the linear combination. Additional bias toward high quality sites, or away from undesirable sites, can be further introduced with probability weighting matrices for attractor and non-attractor matrices. Other known matrices, such as a co-citation matrix or a bibliographic coupling matrix, can also be used in the present invention.

Ranking the pages based on the eigenvector includes determining ranking categories based on the number of pages to be ranked, and classifying each page in one of the categories. A fixed amount of storage for representing the rank of each page is allotted. Each bit in the fixed amount of storage represents one of the categories and the rank of each page is represented by the bit assigned to the page. The eigenvector coefficients of neighboring pages can be used to generate a hub score for one or more of the pages. This ranking method requires a relatively small amount of storage and computational resources.

The method of the invention can also be distributed as a computer program product.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
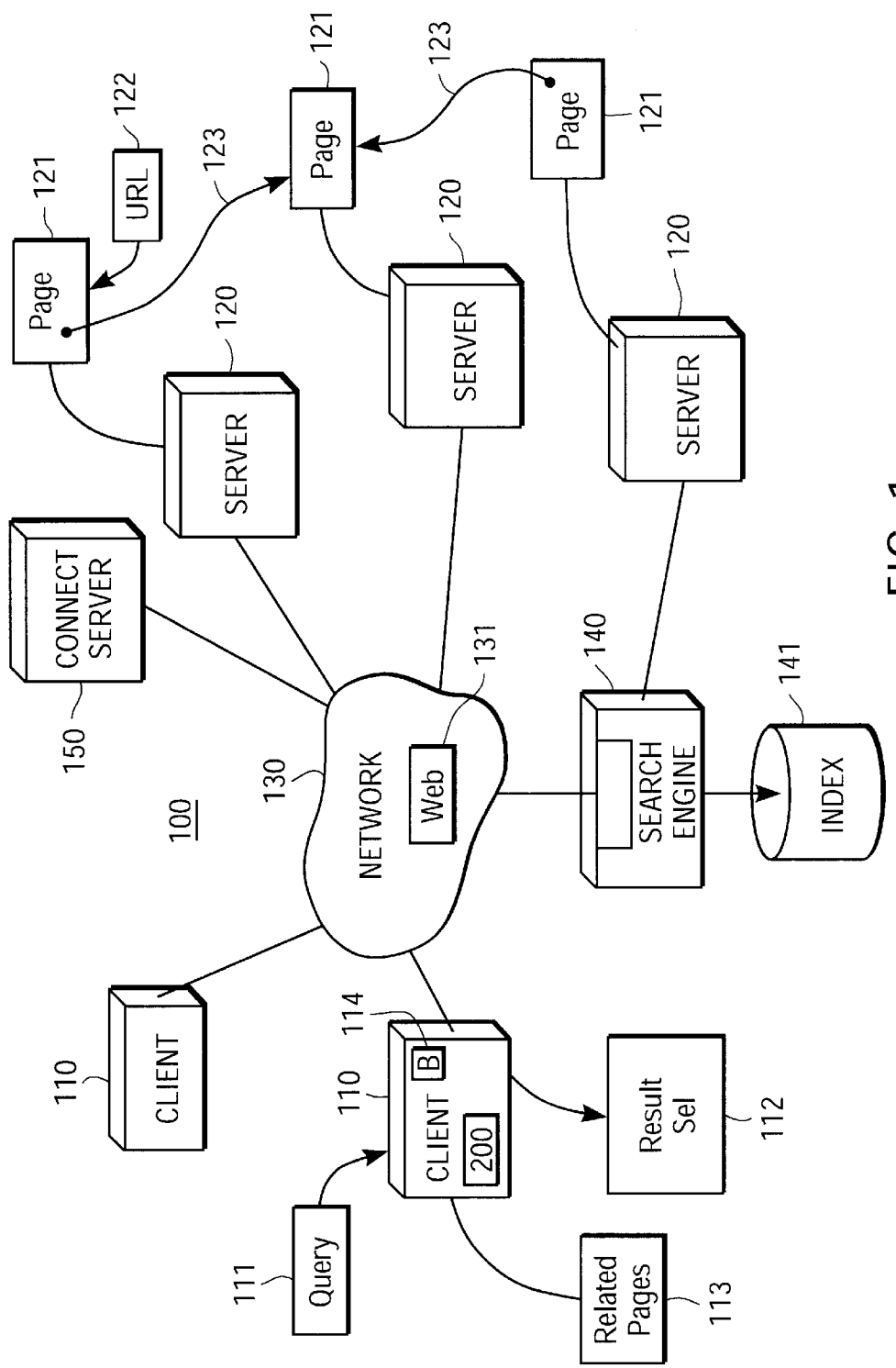
FIG. 1 is a block diagram of a hyperlinked environment that uses the invention.

FIG. 1 shows a database environment 100 where the invention can be used. The database environment is an arrangement of client computers 110 and server computers 120 (generally "hosts") connected to each other by a network 130, for example, the Internet. The network 130 includes an application level interface called the World Wide Web (the "Web") 131. The Web 131 allows the clients 110 to access documents, for example, multi-media Web pages 121 maintained by the servers 120. Typically, this is done with a Web browser application program (B) 114 executing in the client 110. The location of each page 121 is indicated by an associated Universal Resource Locator (URL) 122. Many of the pages include "hyperlinks" 123 to other pages. The hyperlinks are also in the form of URLs.

Although the invention is described with respect to documents that are Web pages, it should be understood that the invention can also be applied to any linked data objects of a database whose content and connectivity can be characterized.

In order to help users locate Web pages of interest, a search engine 140 can maintain an index 141 of Web pages in a memory, for example, disk storage. In response to a query 111 composed by a user using the Web browser (B) 114, the search engine 140 returns a result set 112 which satisfies the terms (key words) of the query 111. Because the search engine 140 stores many millions of pages, the result set 112, particularly when the query 111 is loosely specified, can include a large number of qualifying pages. These pages may, or may not related to the user's actual information need. Therefore, the order in which the result 112 set is presented to the client 110 is indicative of the usefulness of the search engine 140. A good ranking process will return only "useful" pages before pages that are less so.

The present invention provides an improved ranking method that can be implemented as part of a search engine 140. Alternatively, the present method can be implemented by one of the clients 110 as part of the Web browser 114. The present method uses content analysis, as well as connectivity analysis, to improve the ranking of pages in the result set 112 so that just pages related to a particular topic are identified.

The present method uses the eigenvectors of a linear combination of stochastic matrices to rank the results of a query. The matrices capture the relationship of pages to one another to determine the relevance, or "quality", of a page in relation to the topic searched and to other pages.

Figure 2:
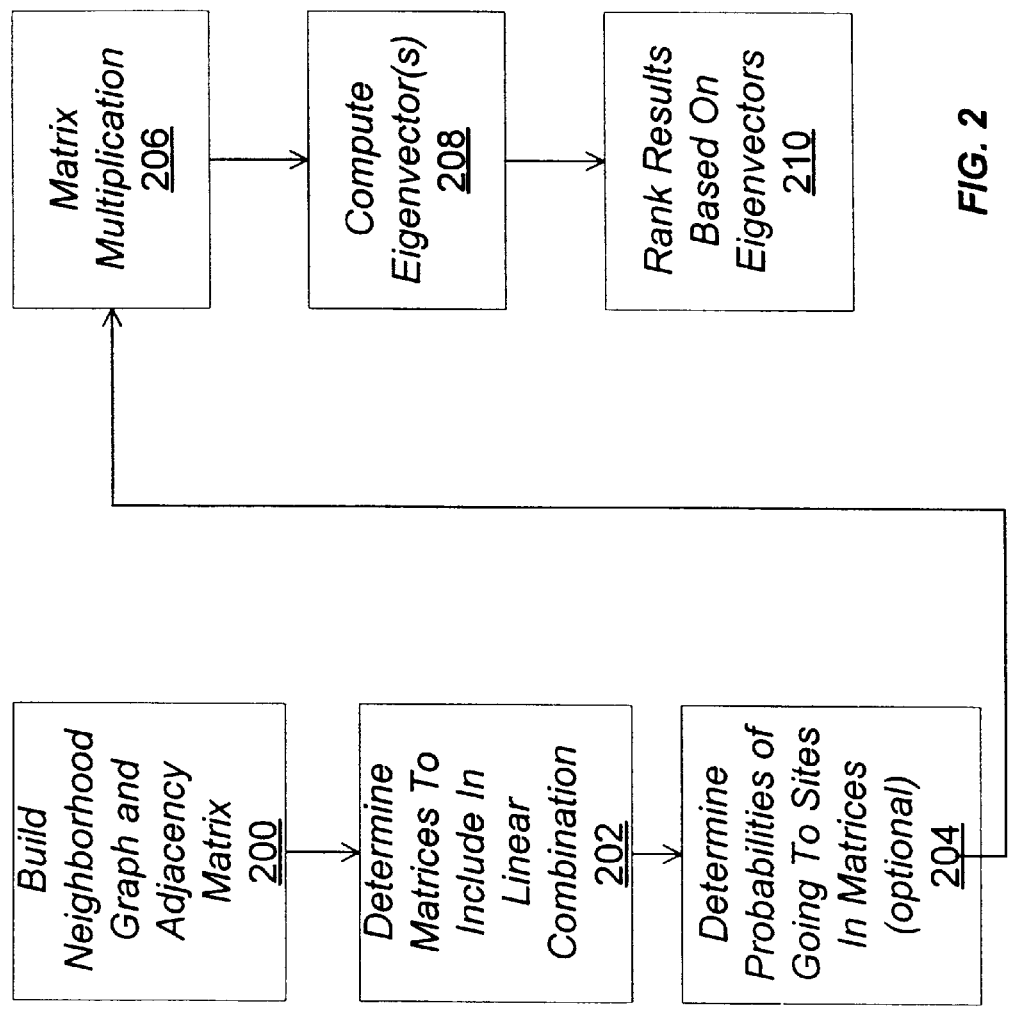
FIG. 2 is a flow diagram of a method for ranking pages in a search result in accordance with the invention.

Referring to FIG. 2, the present method generates a neighborhood graph and adjacency matrix in process 200. In one implementation, a collection C of Web-sites which pertain to a given topic t is assembled. A root set S of sites is obtained by applying a term based search engine to the query q. This is typically done using a search engine that is capable of finding pages related to topic t on the Web. One such suitable search engine relies on the assumption that related pages will tend to be "near" the selected page in the Web neighborhood graph, or that the same keywords will appear as part of the content of related pages. An initial page is selected from the plurality of pages. Pages linked to the initial page are represented as a graph in a memory. This search engine is further disclosed in copending U.S. patent application Ser. No. 09/131,473 entitled "Method For Identifying Related Pages In A Hyperlinked Database," which application is assigned to the same assignee as the present application and is hereby incorporated in its entirety by reference.

From S a base set C is derived which consists of (a) sites in the root set S, (b) sites which point to a site in S, and (c) sites which are pointed to by a site in S. In order to obtain (b), a search engine that stores linkage information, and support queries such as "which sites point to [a given url]" is used. One such suitable search engine is further disclosed in copending U.S. patent application Ser. No. 09/664,647 entitled "Web Page Connectivity Server," which application is assigned to the same assignee as the present application and is hereby incorporated in its entirety by reference.

The collection C and its link structure induce a directed graph G. G's nodes are the sites in C, and for all i, j that are members of C, the directed edge ij appears in G if and only if site i contains a hyperlink to site j. This forms a |C|×|C| matrix that is referred to as the adjacency matrix of G.

Other methods of generating the neighborhood graph and adjacency matrix can also be used in addition to, or instead of, the methods described hereinabove.

In process 202, matrices to be included in a linear combination of matrices are determined. One or more of several different types of matrices that indicate some quality or relationship between the pages can be used in the linear combination. One example of such a matrix is referred to as an "attractor matrix," which is formed by determining the sites in the adjacency matrix that are externally endorsed. A site can be externally endorsed in one of several ways. One way is for a human to view the site and provide an indication that the site includes information on the topic that is likely to be useful to a user. For example, pages related to well-known, pertinent, directories that include a large number links to informative sites are likely to be deemed "attractor sites."

Another way to externally endorse a site is through the use of a computerized utility program that analyzes the content and recognizes keywords, key phrases, page links, and/or other features to determine whether the page includes information that is likely to be useful to the user. The utility program generates the attractor matrix, and may also generate a probability matrix to bias selection of the attractor sites.

Note that both of the methods for identifying attractor sites can be performed offline and the results stored for later use by the search engine. The offline attractor matrices can be updated periodically to incorporate changes in the information available on the Web. Alternatively, attractor sites can be identified at run time in response to a user's query. A combination of offline and runtime attractor sites can also be used.

Another example of a matrix that can be included in the linear combination is referred to as a "non-attractor matrix," which is formed by determining the sites in the adjacency matrix that are externally deemed to be avoided. Similar to attractor sites, a non-attractor site can be externally identified by a human who has viewed the site and deemed it to provide information on the topic that is not likely to be useful to a user. For example, pages that include sexually explicit content would be non-attractor sites for a family-friendly query.

The co-citation matrix, $W^TW$, is another matrix that can be included in the linear combination instead of, or in addition to, the attractor matrix, the non-attractor matrix, and the probability weighting matrices. Each element in the co-citation matrix is the number of sites which jointly cite the page indexed by i and j. Another matrix that can be used in the linear combination is the bibliographic coupling matrix, $WW^T$, the elements of which provide the number of sites jointly referred to by the page indexed by i and j. $W^TW$ and $WW^T$ are well known matrices in the field of bibliometrics.

In process 204, probabilities for weighting the matrices used in the linear combination are determined, as required. For example, the attractor matrix can be weighted by a probability matrix that represents the probability of a user going toward each attractor site. The probability matrix is uniform (i.e., every row includes the same numbers). Similarly, the non-attractor matrix can be weighted by a probability matrix that represents the probability of a user going toward each non-attractor site. Note that the weightings can be chosen so that non-attractor sites appear lower in the rankings than attractor sites, making it less likely that a user would visit non-attractor sites.

The linear combination of matrices is then multiplied and the eigenvectors for the resulting matrix are found using known numerical techniques, as indicated in processes 206 and 208.

When results are output to the user, it is common for users to look at only the top ten or so sites to find the information they are seeking. Thus, it is important to rank the pages in the most useful order. In the present method, the eigenvectors are used to rank the relevance, or "quality" of the sites, as indicated in process 210. The matrix L has a principal eigenvector which corresponds to the eigenvalue of highest magnitude of the matrix that can be determined using one of several known suitable numerical methods. The principal eigenvector includes a number corresponding to each page in the graph. The quality of the page corresponds to the eigenvector number for the page, i.e., the higher the value of the eigenvector coefficient, the more useful the site is likely to be in terms of the quality being sought.

Notably, other eigenvectors beside the principle eigenvector can also be used to rank the pages, instead of or in addition to, the ranking achieved with the principle eigenvector.

Figure 2A:
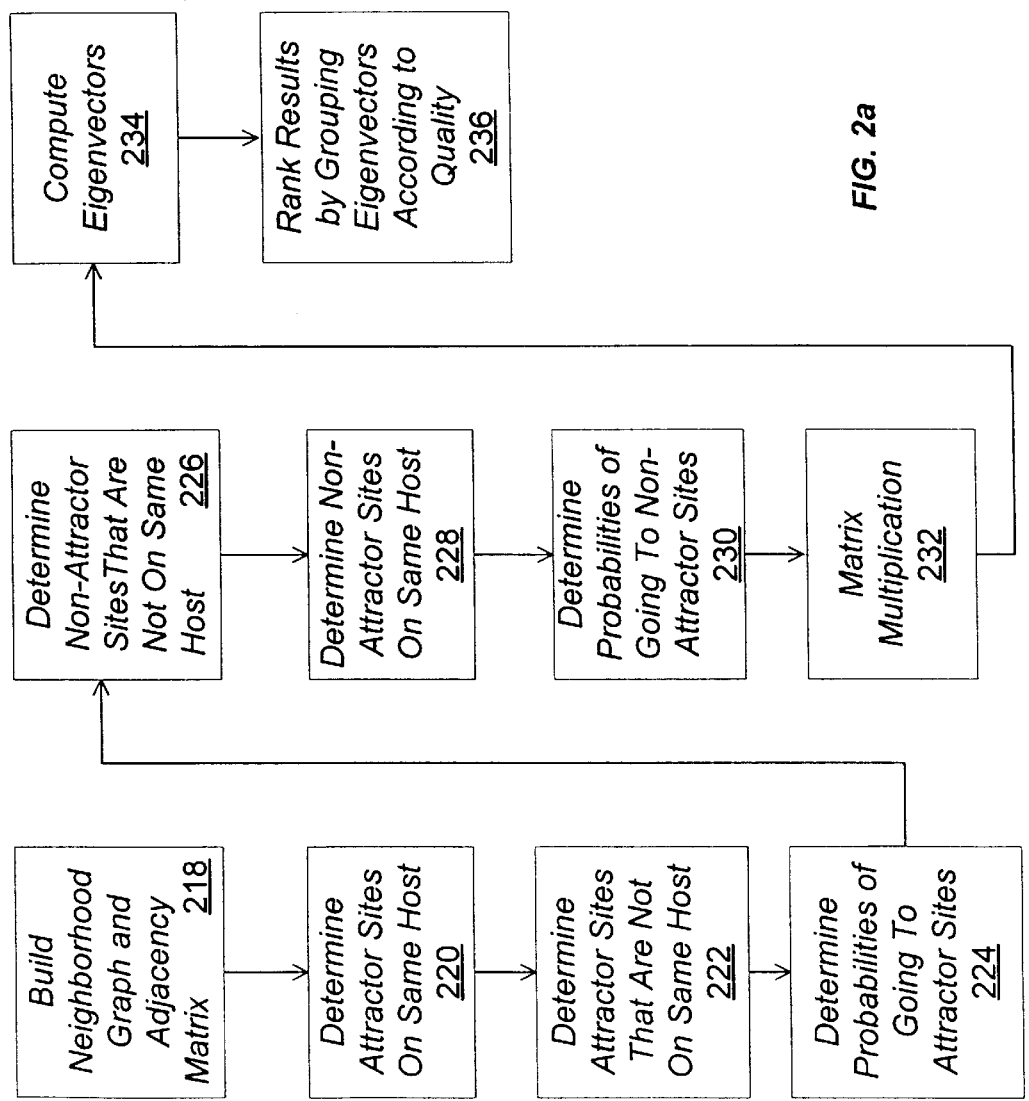
FIG. 2a is a flow diagram of an example of matrices that may be used in a method for ranking pages in a search result in accordance with the invention.

FIG. 2a shows an example of the present method forming a linear combination of attractor and non-attractor matrices, and associated probability matrices. Once the neighborhood graph and adjacency matrix is generated in process 218, processes 220 and 222 split the attractor matrix into sites that are located on the same server, or host, and sites that are located on remote servers or hosts.

The rational for splitting the matrix is that sites that are located on the same host are deemed to be related to one another, making it more likely that the information on the site would be useful. Thus, the related sites can be weighted more heavily in process 224 so that the site appears higher in the rankings and increases the probability of the user visiting them. Similarly, processes 224 and 226 split non-attractor sites into sites that are located on the same host and sites that are located on remote hosts.

In processes 228 and 230, related non-attractor sites on the same host can also be weighted.

The linear combination of matrices is then multiplied and the eigenvectors for the resulting matrix are found using known numerical techniques, as indicated in processes 232 and 234. The eigenvectors are used to rank the relevance, or "quality", of the sites, as indicated in process 236.

Figure 3:
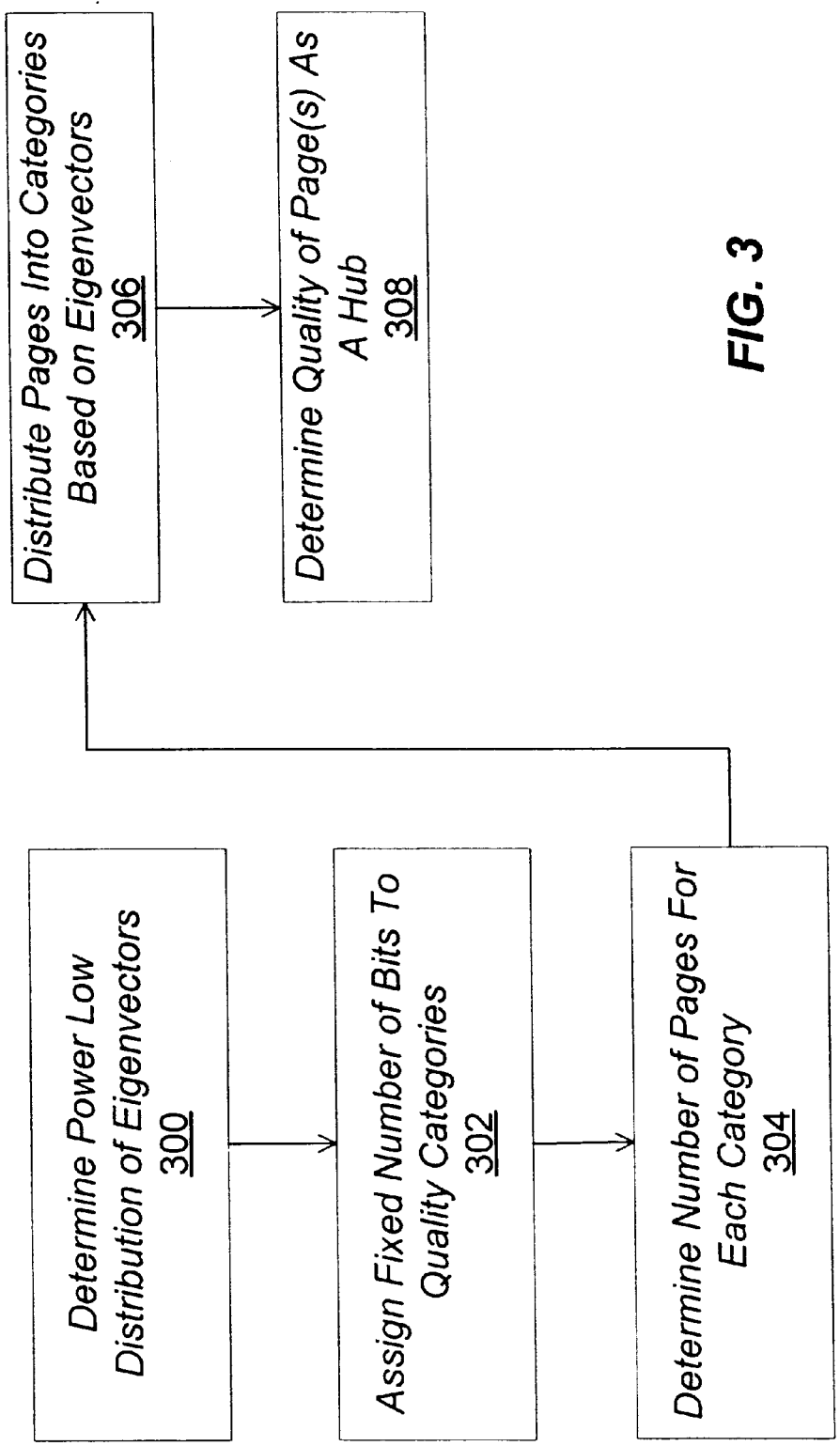
FIG. 3 is a flow diagram of a method for ranking pages in a search result according eigenvector coefficients in accordance with the invention.

FIG. 3 is a flowchart of a method for ranking the pages based on the eigenvector coefficients. Since the neighborhood graph may include millions of pages, it is important to find a way to represent the ranking of the pages using minimal storage space. In process 300, the present method first determines the power low distribution of the eigenvector of interest, whether it is the principal eigenvector, or one of the secondary eigenvectors. The power low distribution is the number of sites whose eigenvector coefficients have a value that is less than a chosen number.

A fixed number of bits representing the ranking of each page is then chosen in process 302. The number of bits used per page depends on the amount of storage space available, the number of pages returned during the search, and the desired granularity of the rankings. In general, it is desirable to use the lowest number of bits per page as possible.

The distribution of the pages' coefficients is analyzed using the low power distribution, and this distribution is used to determine the granularity of the categories of the pages in process 304. For example, the results of a query that includes half a billion sites can be distributed geometrically as follows. The first category, representing the highest ranked pages, is allotted 50 pages. The second category includes the next highest ranked pages, and is allotted a geometric multiple of 50 pages. The multiple can be based on the power low distribution, with the final category being allotted approximately one percent of the pages. Then, each page is assigned to a category by designating a corresponding bit from a multi-bit word in process 306. For example, if 10 bits per page are allotted for ranking, then 1024 categories are available and each page will be assigned to one of the 1024 categories.

Another aspect of the present invention is that the eigenvectors can be used to generate a hub score for one or more pages, as indicated in process 308. A hub score can be generated based on the sum, or a function of the sum, of the eigenvector coefficients of neighboring pages. The hub score thus provides an indication regarding the quality of the page as a hub, or directory of other pages that may provide information that is valuable to the user.

Advantages and Applications

The invention provides a method whereby the linear combination of matrices that provide information about the pages can be used to rank the pages. This allows results to be ranked based on two or more "page qualities" that are sought by the user, thus providing highly relevant results to the user.

The invention accommodates external, subjective or objective judgment regarding the quality of a page in relation to it content or the number of linkages included in the page that are likely to be useful. The judgments are represented in attractor matrices to indicate desirable or "high quality" sites, while non-attractor matrices indicate sites that are undesirable. Attractor matrices and non-attractor matrices can be used alone or in combination with each other in the linear combination. Additional bias toward high quality sites, or away from undesirable sites, can be further introduced with probability weighting matrices for attractor and non-attractor matrices.

The present invention also includes an efficient ranking method that requires a relatively small amount of storage and computational resources.

Those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as other media storage and distribution systems.

Additionally, the foregoing detailed description has set forth various embodiments of the present invention via the use of block diagrams, flowcharts, and examples. It will be understood by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A method of ranking a plurality of pages identified during a search of a linked database, the method comprising:
    forming a linear combination of two or more matrices, wherein each matrix includes information about at least a portion of the plurality of pages;
    determining an eigenvector of the linear combination; and
    ranking the plurality of pages based on the eigenvector.

2. The method, as set forth in claim 1, wherein the eigenvector is the principal eigenvector.

3. The method, as set forth in claim 1, wherein the matrices are stochastic matrices.

4. The method, as set forth in claim 1, wherein at least one of the matrices is an attractor matrix.

5. The method, as set forth in claim 4, wherein at least one of the matrices is a probability matrix for weighting the attractor matrix.

6. The method, as set froth in claim 1, wherein at least one of the matrices is a non-attractor matrix.

7. The method, as set froth in claim 6, wherein at least one of the matrices is a probability matrix for weighting the non-attractor matrix.

8. The method, as set forth in claim 1, wherein at least one of the matrices is a co-citation matrix.

9. The method, as set froth in claim 1, wherein at least one of the matrices is a bibliographic coupling matrix.

10. The method, as set froth in claim 1, wherein ranking the plurality of pages based on the eigenvector comprises:
    determining ranking categories based on the number of pages to be ranked; and
    classifying each page in one of the categories.

11. The method, as set forth in claim 10, further comprising:
    allotting a fixed amount of storage for representing the rank of each page.

12. The method, as set forth in claim 10, wherein each bit in the fixed amount of storage represents one of the categories and the rank of each page is represented by the bit assigned to the page.

13. The method, as set forth in claim 1, further comprising:
    combining eigenvector coefficients of neighboring pages to generate a hub score for at least one of the plurality of pages.

14. A computer program product for ranking a plurality of pages identified during a search of a linked database, the product comprising:
    first program instructions for forming a linear combination of two or more matrices, wherein each matrix includes information about at least a portion of the plurality of pages;

second program instructions for determining an eigenvector of the linear combination; and third program instructions for ranking the plurality of pages based on the eigenvector.

15. The product, as set froth in claim 14, wherein the eigenvector is the principal eigenvector.

16. The product, as set forth in claim 14, wherein the matrices are stochastic matrices.

17. The product, as set forth in claim 14, wherein at least one of the matrices is an attractor matrix.

18. The product, as set froth in claim 17, wherein at least one of the matrices is a probability matrix for weighting the attractor matrix.

19. The product, as set forth in claim 14, wherein at least one of the matrices is a non-attractor matrix.

20. The product, as set forth in claim 19, wherein at least one of the matrices is a probability matrix for weighting the non-attractor matrix.

21. The product, as set forth in claim 14, wherein at least one of the matrices is a co-citation matrix.

22. The product, as set forth in claim 14, wherein at least one of the matrices is a bibliographic coupling matrix.

23. The product, as set forth in claim 14, wherein the third program instructions are further operable to determine ranking categories based on the number of pages to be ranked; and classify each page in one of the categories.

24. The product, as set forth in claim 23, wherein the third program instructions are further operable to allot a fixed amount of storage for representing the rank of each page.

25. The product, as set froth in claim 24, wherein each bit in the fixed amount of storage represents one of the categories and the rank of each page is represented by the bit assigned to the page.

26. The product, as set forth in claim 14, further comprising:

fourth program instructions for combining eigenvector coefficients of neighboring pages to generate a hub score for at least one of the plurality of pages.

27. A device for ranking a plurality of pages identified during a search of a linked database, the device comprising:

means for forming a linear combination of two or more matrices, wherein each matrix includes information about at least a portion of the plurality of pages;

means for determining an eigenvector of the linear combination; and means for ranking the plurality of pages based on the eigenvector.

28. The device, as set forth in claim 27, wherein the eigenvector is the principal eigenvector.

29. The device, as set forth in claim 27, wherein the matrices are stochastic matrices.

30. The device, as set forth in claim 27, wherein at least one of the matrices is an attractor matrix.

31. The device, as set forth in claim 30, wherein at least one of the matrices is a probability matrix for weighting the attractor matrix.

32. The device, as set forth in claim 27, wherein at least one of the matrices is a non-attractor matrix.

33. The device, as set forth in claim 32, wherein at least one of the matrices is a probability matrix for weighting the non-attractor matrix.

34. The device, as set forth in claim 27, wherein at least one of the matrices is a co-citation matrix.

35. The device, as set forth in claim 27, wherein at least one of the matrices is a bibliographic coupling matrix.

36. The device, as set forth in claim 27, wherein the means for ranking the plurality of pages based on the eigenvector comprises:

means for determining ranking categories based on the number of pages to be ranked; and means for classifying each page in one of the categories.

37. The device, as set forth in claim 36, further comprising;

means for allotting a fixed amount of storage for representing the rank of each page.

38. The device, as set forth in claim 36, wherein each bit in the fixed amount of storage represents one of the categories and the rank of each page is represented by the bit assigned to the page.

39. The device, as set forth in claim 27, further comprising;

means for combining eigenvector coefficients of neighboring pages to generate a hub score for at least one of the plurality of pages.

\* \* \* \* \*